Dec. 29, 1931.  J. T. WORTHINGTON  1,838,977

TREATER HAVING COMBINED ELECTRIC FIELD AND WASHER

Original Filed Sept. 19, 1927

INVENTOR:
JOHN T. WORTHINGTON,
BY
Ford W. Lowrie
ATTORNEY.

Patented Dec. 29, 1931

1,838,977

UNITED STATES PATENT OFFICE

JOHN T. WORTHINGTON, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER HAVING COMBINED ELECTRIC FIELD AND WASHER

Application filed September 19, 1927, Serial No. 220,338. Renewed April 27, 1931.

My invention relates to electric treaters which are adapted for the treatment of various liquids and liquids carrying solids in order to facilitate a separation of the undesirable substances therefrom. In the following description the invention will be discussed in the form of a treater adapted to treat a petroleum emulsion. Since the invention is susceptible of treating a wide range of liquids I do not wish to limit myself to the particular embodiment of the invention which will now be described.

In the petroleum industry petroleum often becomes associated with water and an emulsion is formed. It is common practice to break down the emulsion so that the water particles will separate from the petroleum. This is ordinarily accomplished by an electrical dehydrator or treater in which an electric field is established, the emulsion being directed through the electric field.

It is an object of this invention to provide a treater in which the flow of the liquid to be treated tends to remove foreign matter from the treating space.

Another object of my invention is to provide a combined treater and washer. My invention includes means for providing a treating space through which the emulsion to be treated is directed. Connected to the treating space is a conduit which delivers the treated emulsion to a spray pipe. This spray pipe passes the emulsion through a body of washing fluid, such as water, so that the water particles are readily separated from the oil. In the present dehydrators or treaters of this nature, if the level of the water rises the electrodes will be shorted and the efficiency of the treater considerably reduced.

It is an object of this invention to provide a treater in which the high water level or the high bottom settling level of the treater cannot short-circuit the electrodes.

Other objects and advantages of the invention will be made evident hereinafter.

Referring to the drawings in which I illustrate my invention:

Figure 1:
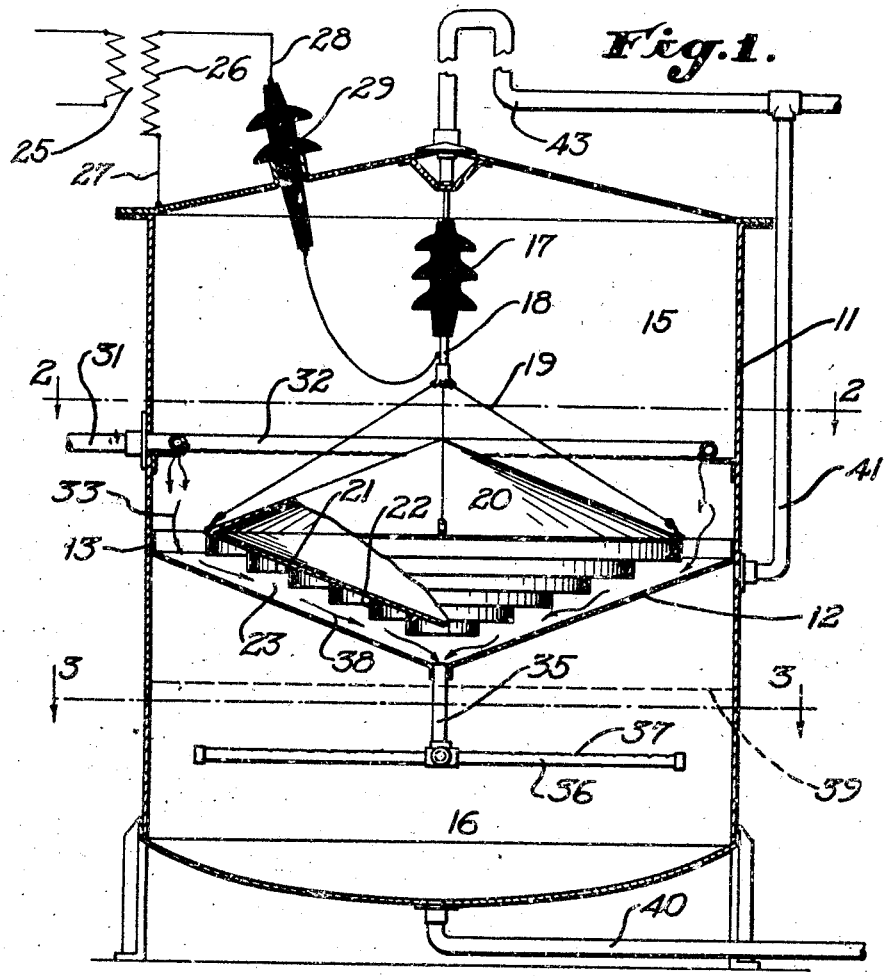
Fig. 1 is a vertical section.
Figure 2:
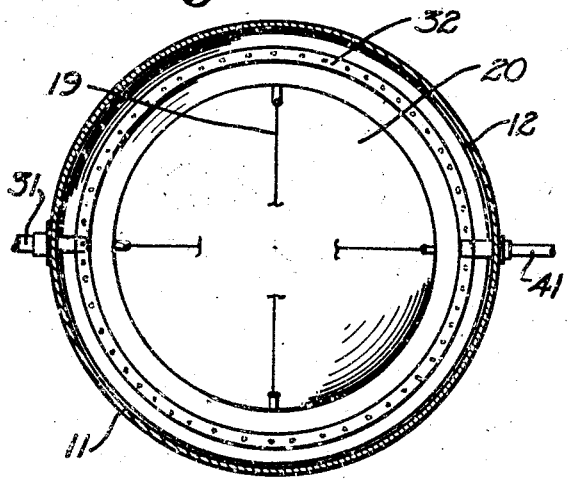
Figs. 2 and 3 are sections taken on the corresponding lines of Fig. 1.
Figure 3:
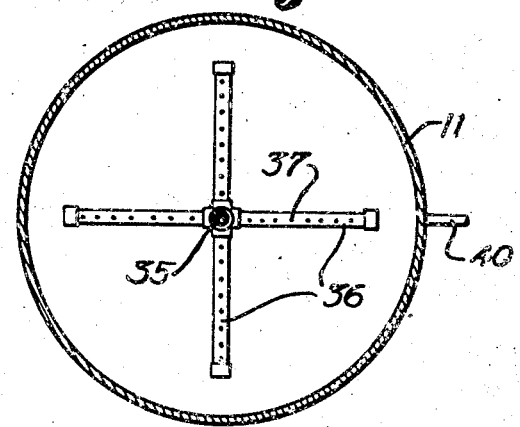

Referring to the drawings in detail, the treater has a shell 11 in which a grounded electrode 12 is secured. The grounded electrode 12 is in the form of an inverted cone. It should be noted that the electrode 12 has a fluid-tight contact at 13 with the shell 11. The shell 11 is therefore divided into an upper treating chamber 15 and a lower settling chamber 16. Depending from the top of the shell 11 as an insulator 17 which supports a rod 18. The rod 18 has wires 19 connected thereto, which wires 19 support a live electrode 20. The live electrode 20 is supported directly above the grounded electrode 12 and is in the form of a double cone. Extending downward from the lower conical portion 21 of the electrode 20 are annular baffles 22, these annular baffles 22 extending into the treating space 23 which is formed between the electrodes 12 and 20. An electric field is established in the treating space 23 by means of a transformer 25, the secondary 26 of which is connected to the tank 11 by a conductor 27 and is connected to the live electrode 20 by means of a conductor 28 which extends through an insulation bushing 29 of the shell 11.

Emulsion is introduced into the shell 11 by means of a pipe 31 which extends through an opening in the shell 11 and is connected to an inlet ring pipe 32. The inlet ring pipe 32 is of slightly smaller diameter than the shell 11 and is disposed in the upper chamber 15 but a short distance above the treating space 23. Openings are provided in the lower part of the inlet ring 32 so that emulsion may fall downward, as indicated by arrows 33, around the upper electrode 20 and into the treating space 23. At the central part of the lower grounded electrode 12 is a depending conduit 35 which projects downward in the lower chamber 16. Connected to the lower end of this conduit 35 is a plurality of spray pipes 36 having upper openings 37. The emulsion passes through the treating space, as indicated by arrows 38, and passes downward through the conduit 35 into the spray pipes 36. This emulsion is directed upward from the spray pipes 36 through the openings 37. A body of water, as indicated by the broken line 39, is at all times maintained in the lower chamber 16 so that the treated emulsion passing into this lower chamber may be washed. Water and foreign matter are withdrawn from the lower part of the chamber 16 through a pipe 40. Dry oil is withdrawn from the upper part of the lower chamber 16 through a dry oil pipe 41. The upper part of the upper chamber 15 has a gooseneck pipe 43 attached thereto so that gas and dry oil, if the pressure is sufficient, may pass from the upper chamber.

The operation of my invention is as follows:

In starting up the apparatus the upper chamber 15 must be filled with a dielectric substance, preferably dry oil. This dry oil may be introduced through the emulsion inlet pipe 31. When the treater is filled with dry oil, emulsion may then be introduced. In view of the fact that the emulsion is heavier than the dry oil it will fall downward from the inlet ring pipe 32 as indicated by arrows 33. If any of the emulsion falls onto the live electrode 20 it will be directed outward by the upper conical face thereof and will reach the treating space 23. When the emulsion passes into the treating space 23 it is acted upon by the electric field which has been established therein due to the action of the transformer 25. The water particles are coalesced into masses of sufficient size to easily separate from the oil. This emulsion passes inwardly and downwardly, as indicated by the arrows 38, and flows through the conduit 35. The emulsion passes from the conduit 35 into the spray pipes 36 and passes from thence into the body of washing liquid in the bottom of the lower chamber 16. The oil is thoroughly washed and then moves upward into the upper part of the lower chamber 16, the water masses thereof remaining in the lower part of the chamber 16. This dry oil is conveyed from the lower chamber 16 by the pipe 41.

The various features of the invention may be briefly enumerated as follows:

The emulsion inlet and the electrodes are so designed that the emulsion will flow downward in such a manner as to tend to keep the treating space 23 free of foreign matter at all times. It will be seen that the washing action of the emulsion will move any foreign matter toward the center of the treating space and downward through the conduit 35, this foreign matter eventually passing into the lower part of the lower chamber 16 and thereafter being withdrawn through the pipe 40. Another important feature of the invention is that any exceptionally high water level in the lower chamber 16 will not short-circuit the electrodes. This is due to the fact that the lower and grounded electrode 12 forms a tight seal with the shell 11. In this manner absolutely no water can reach the chamber 15 in which the live parts of the treater are placed. This is an important advantage since it maintains the efficiency of the treater.

Certain of the features shown and described in this application are described and claimed in a co-pending application filed by Harold C. Eddy, Serial No. 127,951, filed August 7, 1926.

I claim as my invention:

1. A treater comprising: a tank; a lower electrode in said tank for dividing said tank into an upper and a lower chamber; an upper electrode above said lower electrode, there being a treating space between said electrodes; means for setting up an electric field in said treating space; annular fluid inlet means in said upper chamber; fluid washing means in said lower chamber and receiving treated fluid from the central part of said treating space; and fluid outlet means connected to said lower chamber.

2. A treater comprising: a tank; a lower electrode in said tank for dividing said tank into an upper and a lower chamber; an upper electrode above said lower electrode, there being a treating space between said electrodes, and there being an annular space around said upper electrode through which the fluid to be treated may reach said treating space; means for setting up an electric field in said treating space; fluid inlet means in said upper chamber; fluid washing means in said lower chamber and receiving treated fluid from said treating space; and fluid outlet means connected to said lower chamber.

3. A treater comprising: a tank; a lower grounded electrode in said tank for dividing said tank into an upper and a lower chamber; an upper electrode above said lower electrode, there being a treating space between said electrodes; means for setting up an electric field in said treating space; fluid inlet means in said upper chamber; a conduit connected to said treating space and extended downward into said lower chamber; spray means in said lower chamber connected to said conduit; and fluid outlet means connected to said lower chamber.

4. A combination as defined in claim 2 in which said electrodes are in the shape of inverted cones.

5. A combination as defined in claim 2 in which said fluid inlet means comprises an annular spray pipe, the fluid passing therethrough being directed toward said annular space.

6. A treater comprising: a tank; means for dividing said tank into a treating chamber and a settling chamber; means for establishing an electric field in a treating space of said treating chamber; fluid washing means communicating with said treating space and with said settling chamber; a primary fluid outlet means communicating with the lower end of said settling chamber; and a secondary fluid outlet means communicating respectively with the upper ends of said treating and settling chambers.

7. A treater comprising: a tank; a conical grounded electrode dividing said tank into an upper treating chamber and a lower settling chamber; a live conical electrode cooperating with said grounded electrode to define a treating space in said treating chamber; a conduit connected to the apex of said conical grounded electrode in a manner to communicate with the lowest portion of said treating space, said conduit extending into said settling chamber to a point below the surface of a washing liquid therein; means for introducing an emulsion into said treating space and thence through said conduit; and outlet means communicating directly with opposite ends of said settling chamber for conducting the phases of said emulsion from said tank.

8. A combination as defined in claim 7 in which said live conical electrode provides a conical surface for guiding said emulsion into said treating space.

9. A treater comprising: a tank; means extending across said tank and dividing the interior thereof into an upper treating chamber and a lower settling chamber, said settling chamber containing a body of washing medium; means for establishing an electric field in said treating chamber; supply means in said treating chamber for introducing the fluid to be treated into said electric field; and pipe means communicating with said treating chamber and extending downward to a point below the surface of said body of washing medium, said pipe means and said supply means communicating with each other only through said treating space.

10. A treater comprising: a grounded electrode in the shape of a cone with apex downward; a live electrode above said grounded electrode and comprising upper and lower conical members secured together base-to-base, there being a treating space between said grounded electrode and said lower conical member; and means for introducing the fluid to be treated around said live electrode, said upper conical member guiding said fluid into said treating space.

11. In a fluid treater, the combination of: a tank; an intermediate wall therein dividing the space in said tank into an electrical treating chamber and a settling chamber disposed therebeneath; means for introducing a fluid into said electrical treating chamber; means for electrically treating said fluid in said chamber; means for transferring the electrically treated fluid to the lower portion of said settling chamber and there discharging said fluid into said settling chamber; and means for separately drawing off the constituents of the fluid from said settling chamber.

12. In a treater, the combination of: walls forming a treating chamber; walls forming a settling chamber below said treating chamber; means for introducing the fluid to be treated into said treating chamber; means for electrically treating said fluid in said treating chamber; a conduit extending downward in said settling chamber and communicating with said treating chamber; and a spray pipe communicating with the lower end of said conduit and through which treated fluid is introduced into said settling chamber.

In testimony whereof, I have hereunto set my hand at Los Angeles, California, this 12th day of September, 1927.

JOHN T. WORTHINGTON.